(12) United States Patent
Dinan et al.

(10) Patent No.: US 11,233,772 B1
(45) Date of Patent: Jan. 25, 2022

(54) METHODS AND SYSTEMS FOR SECURE CROSS-PLATFORM TOKEN EXCHANGE

(71) Applicant: Worldpay, LLC, Symmes Township, OH (US)

(72) Inventors: Stephen E. Dinan, Austin, TX (US); James S. Osborn, Austin, TX (US); William J. Wied, Austin, TX (US)

(73) Assignee: Worldpay, LLC, Symmes Township, OH (US)

( * ) Notice: Subject to any disclaimer, the term of this patent is extended or adjusted under 35 U.S.C. 154(b) by 267 days.

(21) Appl. No.: 16/697,754

(22) Filed: Nov. 27, 2019

(51) Int. Cl.
| | |
|---|---|
| *G06F 21/62* | (2013.01) |
| *G06Q 20/36* | (2012.01) |
| *H04L 29/06* | (2006.01) |
| *G06F 21/45* | (2013.01) |

(52) U.S. Cl.
CPC ...... *H04L 63/0428* (2013.01); *G06F 21/6245* (2013.01); *G06Q 20/3672* (2013.01); *G06Q 20/3674* (2013.01); *G06F 21/6263* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 10,970,707 B1 * | 4/2021 | Techel | G06Q 20/34 |
| 10,984,424 B1 * | 4/2021 | Ho | G06Q 40/10 |
| 2014/0032418 A1 * | 1/2014 | Weber | G06Q 20/385 705/77 |
| 2018/0048735 A1 * | 2/2018 | Drouin | H04L 63/0428 |
| 2020/0111022 A1 * | 4/2020 | Silberman | G06N 3/0472 |
| 2021/0133700 A1 * | 5/2021 | Williams | G06Q 20/065 |

OTHER PUBLICATIONS

Personal Data Vaults: A Locus of Control for Personal Data Streams. Mun. ACM. (Year: 2010).*
Cloud Credential Vault. Liu.Iaria. (Year: 2010).*
(Continued)

*Primary Examiner* — Venkat Perungavoor
(74) *Attorney, Agent, or Firm* — Bookoff McAndrews, PLLC

(57) ABSTRACT

Systems and methods are disclosed for cross-platform token exchange. One method comprises receiving a primary token exchange request from an upstream entity, generating an ancillary detokenization request based on the primary token exchange request, and transmitting the ancillary detokenization request to an input token vault. An ancillary detokenization response comprising sensitive data may then be received from the input token vault, and one or more ancillary tokenization requests may be generated based on the ancillary detokenization response and the primary token exchange request. The one or more ancillary tokenization requests may be transmitted to one or more output token vaults. Subsequently, one or more ancillary tokenization responses may be received from the one or more output token vaults, each ancillary tokenization response comprising an output token. A primary token exchange response may be generated based on the one or more ancillary tokenization responses and transmitted to the upstream entity.

20 Claims, 11 Drawing Sheets

(56) References Cited

OTHER PUBLICATIONS

Cryptocurrency Wallet for Virtual Currencies. Moujaled. (Year: 2017).*
Indonesia's Public Application Programming Interface (API). Rakhmawati. JPPI. (Year: 2017).*
Payment Point Online Bank Application (PPOB) Using Web Service in Pt. Sukses Mitra Mandiri Based On Android. Wahyudi. (Year: 2019).*

* cited by examiner

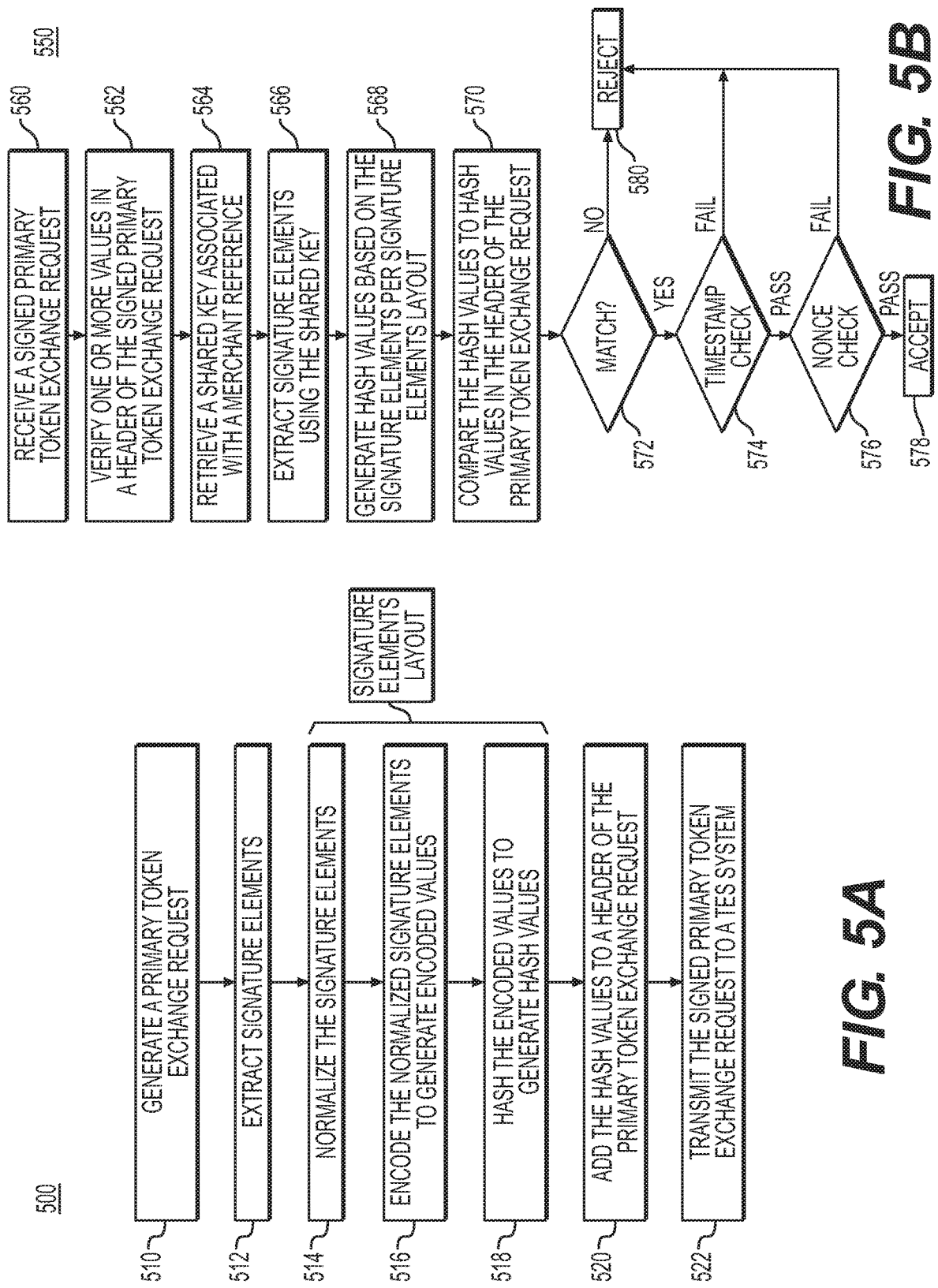

REQUEST BODY - CREDIT/DEBIT CARD

```
{
  "token" : {
    "profileId" : "xis-1",
    "value" : "abc123",
    "payloadType" : "card"
  },
  "cardDetails" : {
    "expirationDate" : "02/22",
    "cvv2" : "123"
  },
  "addressDetails" : {
    "name" : "Muffin Man",
    "address1" : "123 drury lane"
  },
  "outputTokenProviderProfileIds" : [
    "xidDSP1", "omni-ecomm", "wpg-ecomm", ... ]
}
```

*FIG. 6A*

REQUEST BODY - ELECTRONIC CHECK

```
{
  "token" : {
    "profileId" : "xis-1",
    "value" : "abc123",
    "payloadType" : "eCheck"
  },
  "eCheckDetails" : {
    "accountType" : "Personal Checking",
    "routingNumber" : "010234567"
  },
  "addressDetails" : {
    "name" : "Muffin Man",
    "address1" : "123 drury lane"
  },
  "outputTokenProviderProfileIds" : [
    "xidDSP1", "omni-ecomm", "wpg-ecomm", ... ]
}
```

*FIG. 6B*

```
RESPONSE BODY
{
  "messageId" : "(GUID)",
  "tokens" : [
    {
      "tokenProvider" : "XiSecure",
      "profileId" : "xidDSP1",
      "value" : "myXiSecureToken"
    },
    {
      "tokenProvider" : "Omni",
      "profileId" : "omni-ecomm",
      "value" : "myOmniToken",
      "tokenProviderRefId" : "123",
      "newlyCreatedToken" : true
    },
    {
      "tokenProvider" : "WPG",
      "profileId" : "wpg-ecomm",
      "error" : {
        "errorCode" : 1,
        "message" : "failed to create token for x, y, z"
      }
    },
    ...
  ],
  "error" : {
    "errorCode" : 1,
    "message" : "failed to exchange for x, y, z"
  }
}
```

FIG. 7

METHODS AND SYSTEMS FOR SECURE CROSS-PLATFORM TOKEN EXCHANGE

TECHNICAL FIELD

The present disclosure relates generally to the field of secure network transactions and, more particularly, to securely exchanging tokens across multiple transaction platforms.

BACKGROUND

One reality of the modern Internet-connected world is that the storage and transfer of sensitive and secure electronic data is potentially vulnerable to data breaches. Further, as electronic systems, such as point of sales ("POS") systems, become more complex, and as hackers become more sophisticated, security concerns are continually increasing.

In the early days of electronic transactions, dedicated magnetic card readers would scan unencrypted sensitive data on a credit card and transfer it to a transaction service for completion of the transaction. These communications were typically made over a dial-up connection and required basic encryption in the reader device in order to maintain security of the packet.

Over time, the reader devices have become more advanced, often with Internet connections and data input ports that enable malware to infect POS terminals. Further, as more and more merchants have moved to transfer data over the Internet, additional security features have been developed.

Most notably, "tokenization" is a means for replacing sensitive data with a "token" of data that may be non-decryptable or non-detokenizable by the merchant or other tokenization users (e.g. because they require third party decryption). Merchants, for example, might not ever store sensitive data themselves, thus enhancing data security.

SUMMARY OF THE DISCLOSURE

One embodiment provides a computer-implemented method for cross-platform token exchange, comprising: receiving, by a token exchange service system, a primary token exchange request from an upstream entity; generating, by the token exchange service system, an ancillary detokenization request based on the primary token exchange request; transmitting, by the token exchange service system, the ancillary detokenization request to an input token vault; receiving, by the token exchange service system, an ancillary detokenization response from the input token vault; generating, by the token exchange service system, one or more ancillary tokenization requests based on the primary token exchange request and the ancillary detokenization response; transmitting, by the token exchange service system, the one or more ancillary tokenization requests to respective one or more output token vaults; receiving, by the token exchange service system, one or more ancillary tokenization responses from the respective one or more output token vaults; generating, by the token exchange service system, a primary token exchange response based on the one or more ancillary tokenization responses; and transmitting, by the token exchange service system, the primary token exchange response to the upstream entity.

One embodiment provides a system for cross-platform token exchange. The system may comprise one or more processors; and at least one data storage comprising instructions which, when executed by the one or more processors, cause the one or more processors to perform a method comprising: receiving, by a token exchange service system, a primary token exchange request from an upstream entity; generating, by the token exchange service system, an ancillary detokenization request based on the primary token exchange request; transmitting, by the token exchange service system, the ancillary detokenization request to an input token vault; receiving, by the token exchange service system, an ancillary detokenization response from the input token vault; generating, by the token exchange service system, one or more ancillary tokenization requests based on the primary token exchange request and the ancillary detokenization response; transmitting, by the token exchange service system, the one or more ancillary tokenization requests to respective one or more output token vaults; receiving, by the token exchange service system, one or more ancillary tokenization responses from the respective one or more output token vaults; generating, by the token exchange service system, a primary token exchange response based on the one or more ancillary tokenization responses; and transmitting, by the token exchange service system, the primary token exchange response to the upstream entity.

One embodiment provides a non-transitory computer readable medium for cross-platform token exchange. The non-transitory computer readable medium may store instructions that, when executed by one or more processors, cause the one or more processors to perform a method comprising: receiving, by a token exchange service system, a primary token exchange request from an upstream entity; generating, by the token exchange service system, an ancillary detokenization request based on the primary token exchange request; transmitting, by the token exchange service system, the ancillary detokenization request to an input token vault; receiving, by the token exchange service system, an ancillary detokenization response from the input token vault; generating, by the token exchange service system, one or more ancillary tokenization requests based on the primary token exchange request and the ancillary detokenization response; transmitting, by the token exchange service system, the one or more ancillary tokenization requests to respective one or more output token vaults; receiving, by the token exchange service system, one or more ancillary tokenization responses from the respective one or more output token vaults; generating, by the token exchange service system, a primary token exchange response based on the one or more ancillary tokenization responses; and transmitting, by the token exchange service system, the primary token exchange response to the upstream entity.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and together with the description, serve to explain the principles of the disclosure.

FIG. 5A is a flowchart of an exemplary method of signing a primary token exchange request, according to one aspect of the present disclosure.

FIG. 5B is a flowchart of an exemplary method of authenticating a primary token exchange request, according to one aspect of the present disclosure.

FIGS. 6A-6B illustrate example request bodies of primary token exchange requests, according to one aspect of the present disclosure.

FIG. 7 illustrates example response body of a primary token exchange response, according to one aspect of the present disclosure.

DETAILED DESCRIPTION OF EMBODIMENTS

Figure 1:
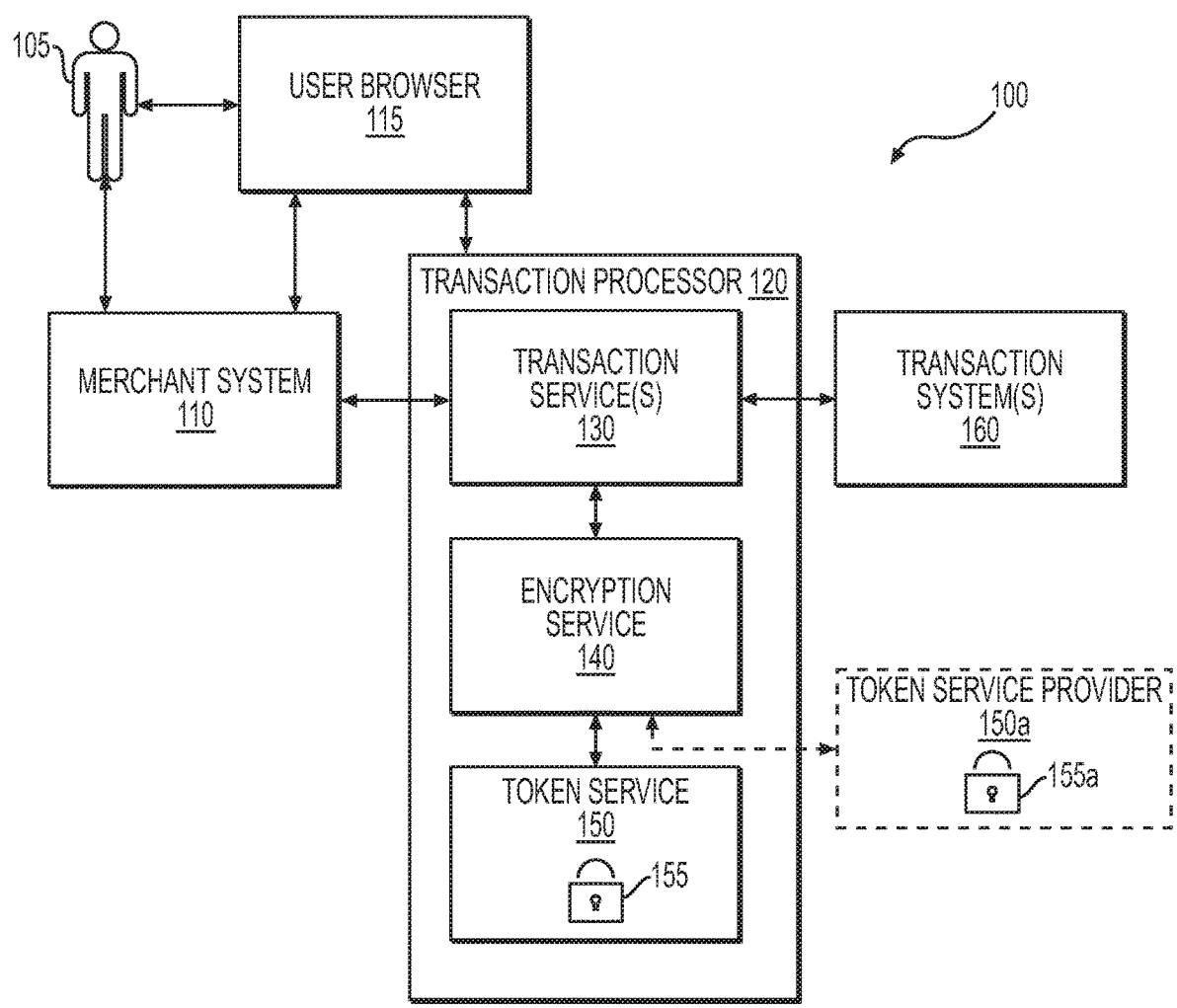
FIG. 1 is a schematic block diagram of an exemplary electronic transaction system, according to one aspect of the present disclosure.

The present disclosed embodiments will now be described in detail with reference to several examples thereof as illustrated in the accompanying drawings. In the following description, numerous specific details are set forth in order to provide a thorough understanding of embodiments of the present disclosure. It will be apparent, however, to one skilled in the art, that embodiments may be practiced without some or all of these specific details. In other instances, well known process steps and/or structures have not been described in detail in order to not unnecessarily obscure the present embodiments. The features and advantages of embodiments may be better understood with reference to the drawings and discussions that follow.

The following discussion relates to methods and systems for secure cross-platform token exchange. Such methods and systems may enable merchants to use downstream processors configured for different token formats, without having to retain sensitive data and/or separate logics for requesting tokens from various token service providers.

Tokenization today is used as a method to provide data security for sensitive data. Through tokenization, a requesting client may be given non-sensitive reference data in exchange for the sensitive data elements. The reference data may be considered non-sensitive since the associated sensitive data may only be retrieved through security controls that authenticate and authorize the requestor. This allows clients to store non-sensitive reference data and to offload any sensitive data storage to tokenization providers, reducing auditing requirements as well as any potential sensitive data loss should a security incident occur.

Tokenization has become a popular method for securing payment transaction data (e.g., primary account numbers, etc.) and many disparate token service providers have emerged to provide this functionality. A client, such as a merchant, may want to bundle functionalities from multiple transaction processing services that do not share common token service providers. Since each token service provider may be proprietary and may not share data with others, there has been no option for a client to operate across token boundaries (i.e., across transaction platforms utilizing disparate tokens) in a secure manner.

This problem does not solely exist across companies, but within them as well. For example, a large payment processing company might, as a result of numerous platforms and acquisitions, have a landscape of numerous different token service providers including, e.g., FastToken, SuperToken, DinanToken, SpeedyToken, etc. As an example, such an e-commerce platform might accept an FastToken, but not a SuperToken. If a client (e.g., a merchant) utilizing SuperToken needs to process directly to the ecommerce platform, there is currently no secure way to obtain a FastToken from the SuperToken retained by the client. The client could choose to detokenize the SuperToken and provide detokenized, sensitive data to the e-commerce platform, but the client would then be exposed to the same security concerns the client was trying to solve through tokenization. The problem of cross-processor token compatibility may continue to be a growing barrier in the future, limiting synergies as the industry consolidates.

To address the problem of token incompatibility, the present disclosure contemplates a token exchange service (TES) system that allows a client to present a token of one type and receive one or more tokens of different types in response. The TES system may perform token exchanges through integration with each of the supported token service providers. The integration may enable detokenizing an input token into sensitive data and then retokenizing the sensitive data into one or more output tokens. The techniques discussed herein may also enable a requesting client to be out of scope of any sensitive data handling by moving those functions and responsibilities to the secure TES system environment.

It should be appreciated that particular consideration is made herein to credit card transactions due to the prevalence of these transactions. Despite this reference to credit cards, the disclosed systems and methods apply equally well to the transfer of any sensitive data, whether "card present" or "card not present" (CNP). Disclosed systems and methods may apply, for example, in online transactions where a user is not physically present at a merchant location. Transactions may include credit/debit transactions, gift card transactions, PayPal transactions, BitCoin transactions, smart card transactions, mobile application transactions, and the usage of loyalty cards, to name a few. Effectively, any circumstance where sensitive data, such as a primary account number (PAN), social security number, bank routing number, driver's license number, etc., or token corresponding thereto, is being transmitted over a network, systems and methods disclosed herein may be employed. Further, while the party seeking to initiate a secure transaction may be referred to herein as a "merchant," a party seeking to initiate a secure transaction need not be a merchant, but may be a service provider, or any party seeking to execute a transaction.

FIG. 1 depicts an electronic transaction system 100 with a merchant system 110, such as a merchant point of sale ("POS") system(s), terminal(s), and/or server, that may collect credit card information (or other sensitive data) and transfer the data securely to the transaction system(s) 160, which may be a payment system(s), via an intermediary such as a transaction processor 120. The user 105 may provide sensitive data directly, such as at a POS terminal at a retail location, or via, for example, remotely via a user browser 115. The user browser 115 may interact with the merchant system 110, and/or directly with the transaction processor 120. The user browser 115 may be a client-side browser on a user computing device, but may also be a client-side app, or any other type of client-side data processor. The merchant system 110 may be a payment terminal (e.g., a "pin pad"), or, a data server, for example, displaying a merchant's e-commerce store. A transaction processor 120, such as a payment processor, may be an intermediary in this system to ensure validity of the request, and may generate a token. The token may be, for example, a randomly generated number. The token may also be a pseudorandom number, encrypted information, or other character sequence. The transaction system(s) 160 may securely return a transaction response to merchant system 110, along with the token generated by the transaction processor 120 and/or transaction system 160.

The token may be unique per customer/person or account number per merchant or organization. Thus, if a given user makes a purchase at merchant A, token A may be generated, but if a given user makes a purchase at merchant B, even if using the same credit card, token B may be generated.

By relying upon a token, a merchant system 110 may no longer be required to send credit card information or other sensitive data for subsequent transactions, and may instead use the token, such as for follow-up activities. For example, a restaurant may initially run a transaction for the cost of a meal, and perform a follow-up transaction using the token for processing the tip. Alternatively, in a card-not-present context, an online merchant may run multiple transactions for a recurring web subscription using one or more tokens. Another example may include recurring transactions for a gym membership. A merchant may use tokens for returns or price adjustments rather than resending sensitive transaction information over a network. Using tokenization, a merchant or merchant may enhance security by not storing sensitive data of customers on its own systems.

As an example, a user 105, such as a customer or purchaser, may interact with the merchant system 110 and/or user browser 115 to initiate a transaction, such as to pay for a good or service. In a physical environment, the user 105 may provide a magnetically stored account number and/or expiration number in the form of a credit card, but any form of sensitive data may be used, in some embodiments. In the e-commerce environment, the user 105 may type the credit card account number and expiration date into the user's computing device, for example in the user browser 115.

The merchant system 110 may include a fixed card reader, an integrated cash register system, a mobile payment application, a consumer's computer, or the like. As noted above, the merchant system 110 may encrypt the collected data at the reader head or processor in order to ensure security. Alternatively, the initial encryption may be performed in software in the merchant system 110, in some embodiments. Encryption may also occur at the user browser 115. Software encryption, however, may increase vulnerability to security breach if merchant system 110 has been compromised. Regardless of the location of initial encryption, an encryption protocol may be employed, in some embodiments. This encryption protocol may include a merchant ID, an amount for the transaction, a password(s) and/or an encrypted portion(s), or other transaction metadata. In some embodiments, the encrypted portion may be in the following format:

<encryption>
<block>
<key>
<serial number>
</encryption>

It should be appreciated that, while a specific encryption protocol is presented here, alternate known encryption schemas may be readily employed in alternate embodiments.

In one embodiment, the merchant system 110 and/or user browser 115 may provide the collected account information (and/or other sensitive data) to a transaction service(s) 130, such as payment service(s), in the transaction processor 120 (e.g., payment management system, payment processor, an acquirer processor, etc.). This transfer of data may be performed over a telecommunications network, for example, the Internet, or via any other type of network. The transaction service(s) 130 may include a plurality of systems for receiving the data, dependent upon transmission mechanism and data type, as will be discussed in greater detail below. The transaction service(s) 130 may perform an initial check for encryption of the data. If the received data is not encrypted, the received data may be transferred promptly to the transaction system(s) 160 for transfer of funds, or directly to entities such as Visa, MasterCard, etc. The transaction system(s) 160 may be operated by entities such as Global Card Bank, for example. However, where encryption is present, and/or tokenization is desired, the transaction service(s) 130 may transfer the information to an encryption service 140 for processing. The transaction service(s) 130 may validate the encrypted block, encrypted key, and/or reader serial number lengths. It may also validate the merchant's ID with a stored database of terminal IDs.

Encryption service 140 may further validate credentials and identify keys for the encrypted data. The data may further be submitted to a token service 150 for decryption using the identified keys and for the generation of a token. In some embodiments, the encryption service 140 may also perform decryption, and the token service 150 may perform tokenization based on decrypted data received from the encryption service 140. The token may comprise data or a value that maps back to sensitive data such as, e.g., a PAN, an expiration date for the token, and/or an expiration date for the card. For example, in a token, sensitive data may be replaced by a series of randomly-generated numbers. Therefore, tokenization is the process of protecting sensitive data by replacing it with an algorithmically generated number(s), which may be called a token. Tokens might also not themselves contain any sensitive data, but rather merely correspond to sensitive identification data such as social security numbers, account information, or other sensitive financial data, such as cardholder data. The sensitive data may be stored securely in token vault 155 or elsewhere. Specifically, the token vault 155 may establish and maintain the token-to-sensitive data mapping.

In some embodiments, the token service 150 may be implemented outside the transaction processor 120, and may be in communication with the transaction processor 120 to receive data needed for tokenization and return generated tokens. The token service 150 implemented outside the transaction processor 120 may be referred to as a token service provider 150a, as shown in FIG. 1. Token service provider 150a may receive data needed for tokenization from the transaction processor 120 (e.g., encryption service 140 thereon), generate tokens based on the received data, and transmit the tokens to the transaction processor 120. As alluded to above, the tokens may then be provided to the merchant system 110 for subsequent use. The token service provider 150a may be a computing system implemented and maintained by the transaction processor 120 to generate tokens proprietary to and/or compatible with the transaction processor 120. In other embodiments, the token service provider 150a may be a computing system implemented and maintained by a third-party that is contracted to provide tokenization service to the transaction processor 120. Similar to the token service 150, the token service provider 150a may comprise a token vault 155a, which stores token-to-sensitive data mapping.

Tokens provided by one transaction processor (i.e., a token service or token service provider associated therewith) may be different from tokens provided by another transaction processor (i.e., a token service or token service provider associated therewith). For example, transaction processor A may provide tokens in format A, and transaction processor B may provide tokens in format B. Further, transaction processor A may be configured to process tokens in format A, and transaction processor B may be configured to process tokens in format B. Therefore, if a merchant system retaining tokens in format A sends those tokens to transaction processor B, transaction processor B may not be able to process the tokens since they are in format A. Likewise, if a merchant system retaining tokens in format B sends those tokens to transaction processor A, transaction processor A may not be able to process the tokens since they are in format B. However, if a merchant system retains both tokens in format A and tokens in format B, the merchant system may be able to utilize the token-related services provided by both transaction processor A and transaction processor B, by sending appropriate tokens to each of those transaction processors. However, in some embodiments, a transaction processor may be configured to provide and process more than one type of token.

In some embodiments, any expiration date of the token, if present, may be varied depending upon whether the token is designated as a single use token or as a token for recurring transactions (i.e., a subscription). For example, a one-year and two-year expiration may be provided for single use and recurring tokens, respectively, which allows for a longer validity period where the merchant is anticipating reuse of the token, and ensures that single use tokens are not stored longer than necessary.

The token, which may be encrypted, and clear text of the data supplied by the merchant system 110, may be returned to the encryption service 140 and subsequently to the transaction service(s) 130. The transaction service(s) 130 may transfer the clear text to the transaction system(s) 160 for a transaction response. The response may then be provided, along with the token, back to the merchant, such as to the merchant system 110. The merchant may then store the token (e.g., encrypted token) for later transactions.

Thus, the merchant system 110 may be prevented from accessing sensitive data without keys and/or token-to-sensitive data mapping, which may be maintained within the token vault 155 or 155a, or elsewhere in a secured location accessible to the transaction processor 120. Thus, for account information to be compromised, both the merchant system 110 (or other merchant storage) and the transaction processor 120 would need to be breached. In case the token service 150 is implemented outside the transaction processor 120 as a token service provider 150a, for account information to be compromised, all of the merchant system 110, transaction processor 120, and token service provider 150a may need to be breached. Alternatively, sensitive data and/or tokens comprising sensitive data may be stored exclusively within the transaction processor 120.

Figure 2:
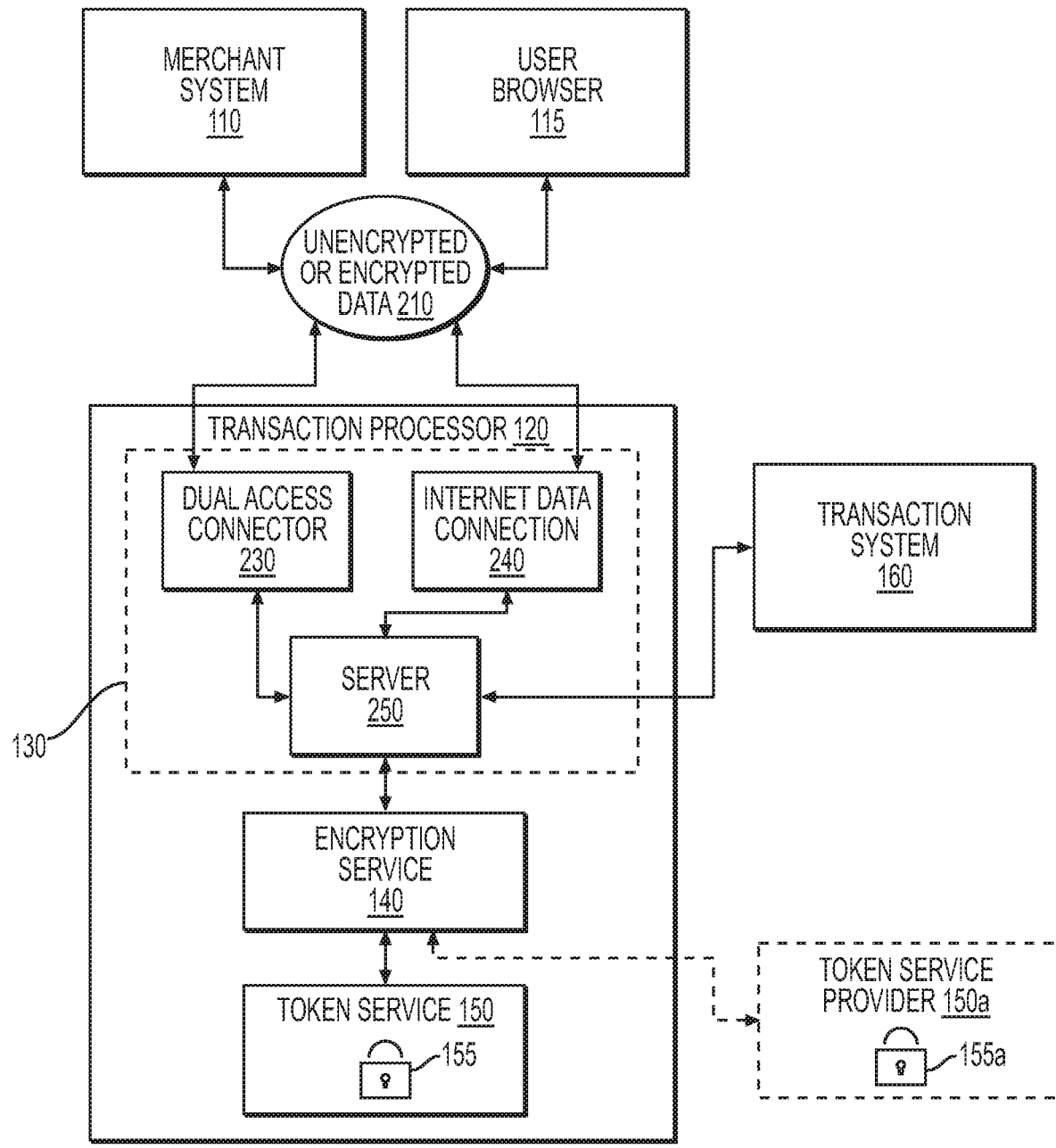
FIG. 2 is a schematic block diagram of an exemplary transaction processor, according to one aspect of the present disclosure.

FIG. 2 is a schematic block diagram for a more detailed view of the components within the transaction processor 120, in accordance with some embodiments. In this example block diagram, unencrypted data or encrypted data 210 from the merchant system 110 and/or user browser 115 may be delivered to the transaction processor 120, such as to the transaction service(s) 130, via, for example, a dial-up access connector 230, or Internet data connection 240, through which data may pass, for example, via a network socket and/or web service. Although a dial-up access connector 230 and Internet data connection 240 are shown, any type of data connection may be established for data transfer purposes. Incoming data may be provided to server 250.

In addition to the server 250, other servers may be included, in alternate embodiments, in order to handle any data inputs. For example, in embodiments where gift cards or loyalty cards are being processed, the system may include a gift card server or loyalty card server. The system may be scalable to take any number of payment types, as is desirable for any particular scenario.

The server 250 may determine whether a token is present and/or if data is encrypted. If the data is not encrypted and the merchant system 110 is not set up for tokenization, the clear text data may be transferred to the transaction system(s) 160 (such as Global Card Bank, Visa, etc.) for approval or declining. Otherwise, if the data includes a token or encrypted data, or if tokenization is otherwise requested, the data may be provided to the encryption service 140, as previously discussed.

It should be noted that, although FIGS. 1-2 depict the transaction processor 120 to be implemented as a single computing device, the transaction processor 120 may be implemented on multiple computing devices, thereby forming a distributed transaction processor computing system. For example, the individual components shown within the transaction processor 120 may be distributed over the network and may be in communication with each other. Therefore, whenever the present disclosure mentions a "transaction processor," it should be understood that the transaction processor may be a stand-alone computing device or a distributed computing system comprising multiple, connected computing devices.

Figure 3:
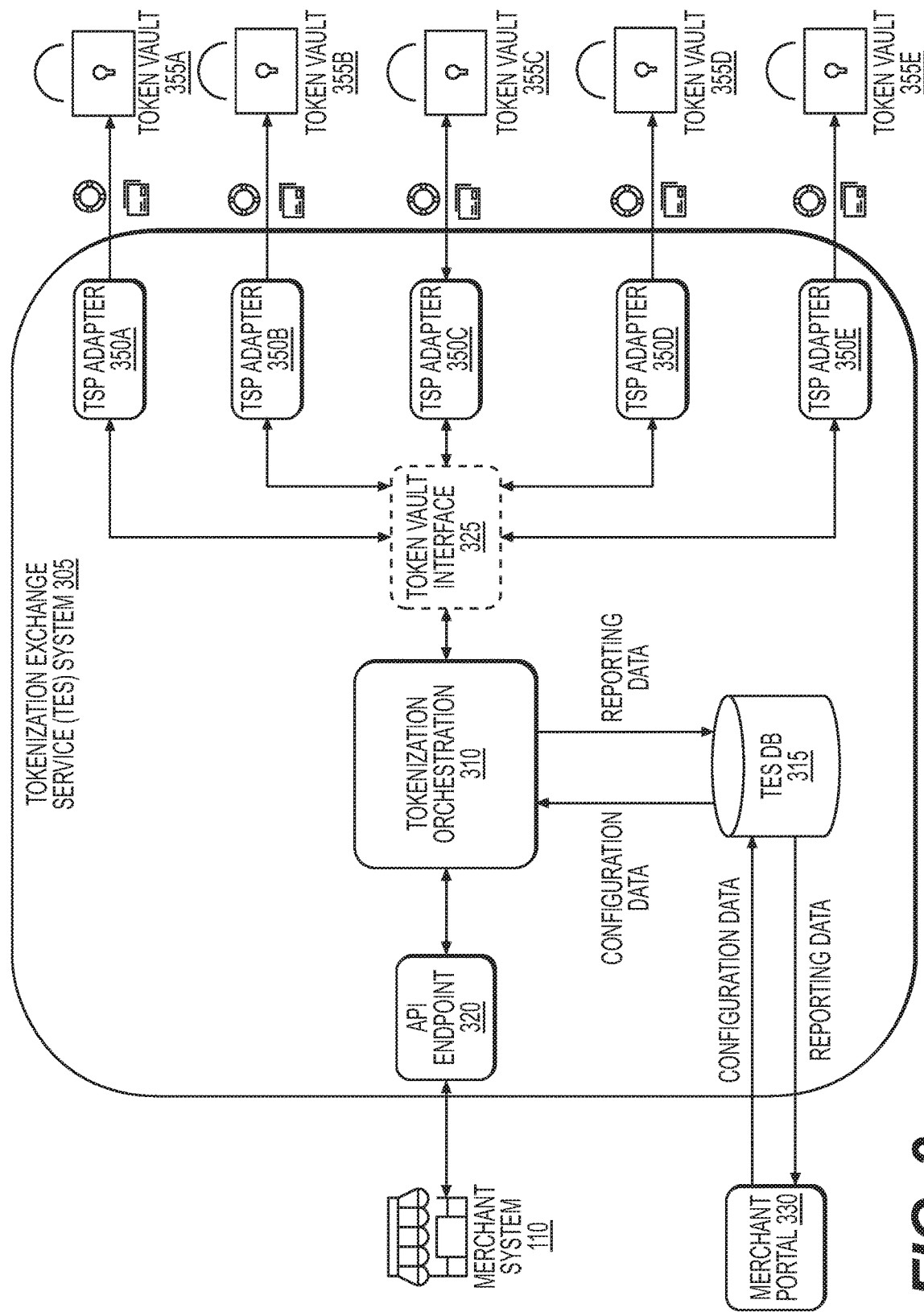
FIG. 3 is a schematic block diagram illustrating various components of an exemplary tokenization exchange service (TES) system, according to one aspect of the present disclosure.

FIG. 3 is a schematic block diagram illustrating various components of an exemplary tokenization exchange service (TES) system, according to one aspect of the present disclosure. In general, a TES system 305 may comprise an application programming interface (API) endpoint 320, a tokenization orchestration logic 310, a TES database 315, a token vault interface 325, and token service provider (TSP) adapters 350A-350E. The TES system 305 may be in communication with a merchant system 110 and one or more token vaults 355A-355E. Further, the TES system 305 may provide a merchant portal 330. The individual components associated with the TES system 305 will now be discussed in greater detail.

As alluded to above, while it may be beneficial for a merchant system 110 to process transactions utilizing various types of transaction processors 120, the merchant system 110 may only have tokens that are compatible with a particular transaction processor, or a limited set of transaction processors. To solve or mitigate this problem, the merchant system 110 may operate in conjunction with the TES system 305.

For merchant system 110, one or more authentication identities may be created and given different authorization permissions such as, e.g., tokenize, detokenize, token swap, etc. These high-level permissions may apply across all token service provider configuration instances for the merchant. For merchant system 110 therefore, multiple token service provider configuration instances may be created. A configuration instance may define provider-specific configuration items, such as, e.g., uniform resource locator (URL), certificate, user name and password, etc. As will be discussed in the following sections, the configuration instances may be provided to and used by the TES system 305 to generate instructions/requests to various token vaults 335A-355E.

Figure 4:
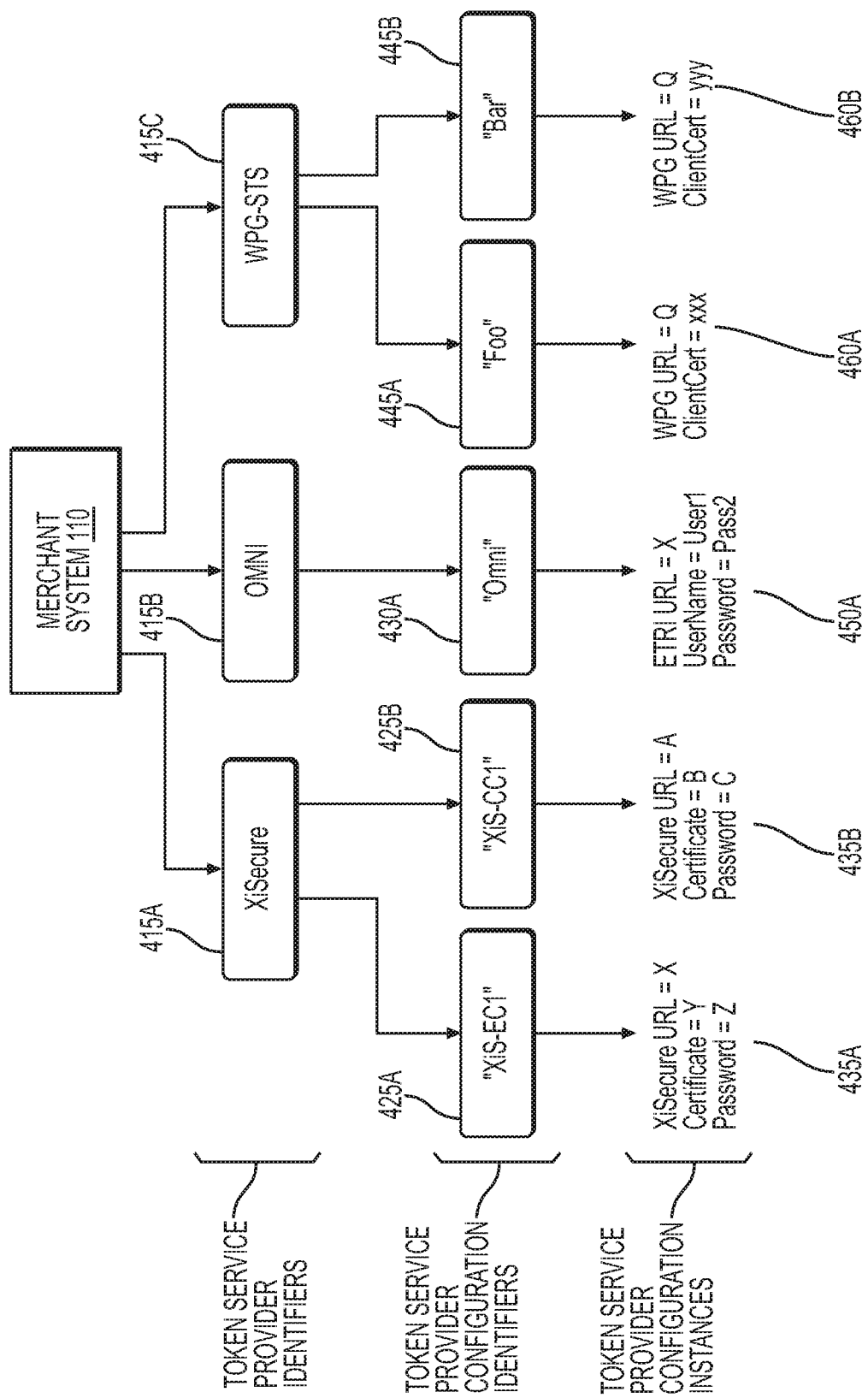
FIG. 4 is a block diagram illustrating token service provider configuration instances created for a merchant system, according to one aspect of the present disclosure.

FIG. 4 shows a block diagram illustrating token service provider configuration instances created for merchant system 110, according to one aspect of the present disclosure. The merchant system 110 may store one or more token service provider identifiers corresponding to token service providers (or token service provider types) that may provide a token exchange service for the merchant system 110 via the TES system 305. In FIG. 4, merchant system 110 is associated with three token service providers identified as XiSecure 415A, OMNI 415B, and WPG-STS 415C. Each token service provider may be associated with one or more configuration instances, and each configuration instance may be assigned an identifying name, or a configuration identifier that is unique within the scope of the merchant system 110. For example, the token service provider XiSecure 415A may be associated with configuration instances 435A and 435B, which are assigned configuration identifiers XiS-EC1 425A and XiS-CC1 425B, respectively. The token service provider OMNI 415B may be associated with configuration instance 450A, which is assigned a configuration identifier Omni 430A. The token service provider WPG-STS 415C may be associated with configuration instances 460A and 460B, which are assigned configuration identifiers Foo 445A and Bar 445B, respectively. The token service provider identifiers and/or token service provider configuration identifiers may be used with token exchange requests, in order for the TES system 305 to determine which configurations to utilize during processing of each token exchange request. In some embodiments, duplicate configuration instances for the same token service provider may be created. For example, if a merchant system 110 has two token vaults associated with the same token service provider (i.e., one token vault for one type of sensitive data (e.g., credit card data) and another token vault for another type of sensitive data (e.g., checking account data)), duplicate configuration instances for the same token service provider may be created.

With renewed reference to FIG. 3, the merchant portal 330 may act as an interface for a client (i.e., a merchant), through which configuration data discussed above in reference to FIG. 4 (e.g., configuration instances, and corresponding configuration identifiers and token service provider identifiers) may be provided to the TES database 315. Further, the merchant portal 330 may enable the client to activate or deactivate (i.e., turn on or off) functionality options for a token exchange service. The client may be able to activate or deactivate the token exchange service via the merchant portal 330. If the token exchange service is activated, the client may be given an option to activate or deactivate each token service provider. For example, in the case of the merchant system 110 shown in FIG. 4, the client may be able to activate or deactivate each of the token service providers XiSecure, Omni, and WPG-STS. The presentation of the different token service providers may be dynamically driven based upon new data-mapping entries defining the token service providers.

The TES system 305 may receive requests from the merchant system 110 at the API endpoint 320. The requests received from the merchant system 110 may be application programming interface (API) requests. In one embodiment, the requests may be for token exchange. Such token exchange requests received from the merchant system 110 may be referred to as primary token exchange requests throughout the present disclosure. The primary token exchange request may be securely transmitted from the merchant system 110 to the TES system 305 using Hypertext Transfer Protocol Secure (HTTPS) transport. Requests made using Hypertext Transfer Protocol (HTTP) may be rejected by the TES system 305 at the API endpoint 320. Further, access to the TES system 305 may be gated by whitelisting client IP addresses (e.g., merchant system IP addresses). The primary token exchange request may be in JavaScript Object Notation (JSON) format, or any other format usable in an API request, such as, e.g., eXtensible Markup Language (XML). The format may be specified in the header of the request such as, for example, ContentType: application/json.

In describing various types of requests generated by the merchant system 110 and the TES system 305, which will be described in greater detail below, the following designations will be used throughout the present disclosure:

Primary token exchange request: A request generated by the merchant system 110 and transmitted to the TES system 305, to exchange an input token for one or more output tokens. The request may comprise the input token.

Primary token exchange response: A response generated by the TES system 305 including one or more output tokens exchanged for an input token, and transmitted to the merchant system 110.

Ancillary detokenization request: A request generated by the TES system 305 (i.e., a TSP adapter thereof) and transmitted to an input token vault (i.e., input token service provider), to detokenize an input token. The request may comprise the input token.

Input token vault (i.e., an input token service provider): A token vault (i.e., a token service provider) that processes an ancillary detokenization request and detokenizes an input token into sensitive data.

Ancillary detokenization response: A response generated by an input token vault including sensitive data extracted from an input token, and transmitted to the TES system 305.

Ancillary tokenization request: A request generated by the TES system 305 (i.e., a TSP adapter thereof) and transmitted to an output token vault (i.e., output token service provider), to tokenize sensitive data. The request may comprise the sensitive data.

Output token vault (i.e., an output token service provider): A token vault (i.e., a token service provider) that processes an ancillary tokenization request, retrieves/generates an output token that corresponds to sensitive data in the ancillary tokenization request (i.e., "vaulting" the sensitive data), and returns the output token.

Ancillary tokenization response: A response generated by an output token vault including an output token retrieved/generated from vaulting the sensitive data, and transmitted to the TES system 305.

A primary token exchange request from the merchant system 110 may comprise (in the request body, for example) an input token value, an input token service provider configuration identifier, and one or more output token service provider configuration identifiers. An input token value may be the value of the token retained by the merchant system 110. An input token service provider configuration identifier may identify i) the input token service provider that generated the input token and ii) the configuration of the input token service provider. Using the input token service provider configuration identifier, the TES system 305 may determine the input token service provider to which the input token needs to be routed, and may also determine which configuration to use in forming an ancillary detokenization request. The ancillary detokenization request comprises the input token that is routed to the input token service provider. An output token service provider configuration identifier may identify i) the output token service provider that will generate an output token and ii) the configuration of the output token service provider. Using the output token service provider configuration identifier, the TES system 305 may determine the output token service provider to which sensitive data received from an input token service provider needs to be routed, and may also determine which configuration to use in forming an ancillary tokenization request. The ancillary tokenization request comprises the sensitive data that is routed to the output token service provider. The output token may be the token that the merchant system 110 might be in need of, for example, to process transactions using a transaction processor 120 configured for a token format consistent with the output token. In some embodiments, the primary token exchange request may also comprise supplemental data, such as an expiration date, a card security code, an address and/or a name (that is associated with a payment vehicle, for example), or any information that is supplemental to the sensitive data protected by tokenization. Further, the primary token exchange request may also indicate the payment vehicle type that the primary token exchange request is associated with.

It should be noted, while the input and output token service providers may be determined based on the input and output token service provider configuration identifiers included in primary token exchange requests as explained above, the input and output token service providers may be determined by inferring the input and output token service provider configuration identifiers based on other information or properties included in the primary token exchange requests. A primary token exchange request may thus comprise information or properties that may be used by the TES system 305 to infer input and/or output token service provider configuration identifiers. For example, the TES system 305 may look up a default token service provider destination configuration (i.e., infer input and/or output token service provider configurations) based on the information or properties contained in the primary token exchange request.

Prior to submitting the primary token exchange request to the TES system 305, the primary token exchange request may be signed using a shared key, which is generated during onboarding through the merchant portal 330. FIG. 5A shows a flowchart of an exemplary method of signing a primary token exchange request, according to one aspect of the present disclosure. Notably, method 500 may be performed by the merchant system 110. At step 510, the merchant system 110 may generate a primary token exchange request. At step 512, the merchant system 110 may extract signature elements from the primary token exchange request. For example, the signature elements may include the following:

Merchant Ref: a merchant identifier assigned by a transaction processor 120, submitted in the 'merchant-ref' field of the request header Shared key: a shared key generated via the merchant portal 330, which is stored in the TES database 315 and transmitted to the merchant system 110 through the merchant portal 330 (shared keys are not included in the request header or body)

Timestamp: a client-provided value submitted in the 'timestamp' field of the request header Nonce: a client-generated value included in the 'nonce' field of the request header Request URI: taken from the request, with the base URL and protocol/server stripped Request method: method name associated with the request (e.g., POST, PUT, GET, DELETE)

Packet: a request body (GET request methods will have empty field(s))

For purposes of illustration only, below are exemplary signature elements and corresponding values:

Merchant Ref: cfd636a7-2296-4ab4-b6b1-5a52d9b15c43
Shared Key: a6606829-adc8-41b6-9843-93b4df1168af
Timestamp: 2016-08-24T21:38:55Z
Nonce: fe895935-07ab-439f-819d-cf93be64fa21
Request URI: https://tes.paymetric.com/ping
Request Method: POST

```
Packet:           {
"ping": {
                      "merchRef": "123A-321C",
                      "requestMethod": "POST"
                  }
}
```

Prior to hashing the signature, elements to be signed may first be normalized to insure proper validation by the TES system 305 and to avoid misinterpretation by the merchant system 110. For example, normalization and subsequent hashing may comprise the following steps, collectively referred to as signature elements layout. At step 514, the merchant system 110 may normalize the signature elements. For instance, signature elements may be presented in a predetermined order in a single line (e.g., [Mer Ref]|[Shared Key]|[TS ISO 8601 to second][NONCEGUID]|[RequestURI]|[Request Method]|[Packet]) with the timestamp in UTC (e.g., ISO 8601 to the second, e.g. 2016-08-24T21:38:55Z) and each element being delimited by T (pipe character), as follows:

cfd636a7-2296-4ab4-b6b1-5a52d9b15c43|a6606829-adc8-41b6-9843-93b4df1168af|2016-08-24T21:38:55Z|fe895935-07ab-439f-819d-cf93be64fa21|ping|POST|{"ping": {"merchRef": "123A-321C"}}

Further, all alphabetical characters may be in uppercase and all whitespaces may be removed, as follows:

CFD636A7-2296-4AB4-B6B1-5A52D9B15C43|A6606829-ADC8-41B6-9843-93B4DF1168AF|2016-08-24T21:38:55Z|FE895935-07AB-439F-819D-CF93BE64FA21|PING|POST|{"PING": {"MERCHREF":"123A-321C"}}

Then, at step 516, the merchant system 110 may encode the normalized signature elements with an encoding scheme such as, e.g., Base64, to generate encoded values. Exemplary encoded values are shown below:

QOZENjM2QTctMjI5Ni00QUI0LUI2QjEtNUE1MkQ5QjE1QzQzfEE2NjA20D15LUFEQzgtNDFCNi050DQzLTkzQjRERjExNjhBRnwx0TIuMTY4LjEuMXwxNDY4NDI2NTc5fEZFODk1OTM1LTA3QUItNDM5Ri04MTIELUNGOTNCRTYORkEyMXxQSU5HfFBPU1R8eyJQSU5H1jp71k1FUkNIUkVGIjoiMTIzQS0zMjFDIn19

At step 518, the merchant system 110 may hash the encoded values using a hashing algorithm such as, e.g., SHA 256, to generate hash values. Exemplary hash values are shown below:

493b60f4793fac769e00b84f9Ocbdf65677a198025bcfd9 6fe752735b5ba2459

At step 520, the merchant system 110 may add the hash values to the header of the primary token exchange request header as an "authorization" value, as follows:

accept: application/json
authorization:
493b60f4793fac769e00b84f9Ocbdf65677a198025bcf d96fe752735 b5ba2459
merchant-ref: cfd636a7-2296-4ab4-b6b1-5a52d9b15c43
timestamp: 2016-08-24T21:38:55Z
nonce: fe895935-07ab-439f-819d-cf93be64fa21

At step 522, the merchant system 110 may transmit the signed primary token exchange request to the TES system 305.

Upon receiving the signed primary token exchange request, the TES system 305 may verify the primary token exchange request by performing a series of authentication steps. FIG. 5B shows a flowchart of an exemplary method of authenticating a primary token exchange request, according to one aspect of the present disclosure. Notably, method 550 may be performed by the TES system 305 (or API endpoint 320 therein). At step 560, the TES system 305 may receive a signed primary token exchange request. At step 562, the TES system 305 may verify one or more values in the header of the signed primary token exchange request. For example, the TES system 305 may verify that the timestamp in the request header is within an allowed rage, the merchant-ref is valid and active, and/or nonce is non-duplicate within an allowed range. At step 564, the TES system 305 may retrieve a shared key associated with a merchant reference from the TES database 315, the merchant reference ("merchant-ref") being specified in the header of the primary token exchange request. At step 566, the TES system 305 may extract signature elements from the request using the shared key. At step 568, the TES system 305 may generate hash values using the signature elements. For example, the TES system 305 may generate hash values by following the signature elements layout that was previously performed by the merchant system 110 (e.g., steps 514, 516 and 518 in method 500). At step 570, the TES system 305 may compare the generated hash values to the hash values in the header of the primary token exchange request. At step 572, if the values do not match, method 550 may proceed to step 580 where the primary token exchange request is rejected (i.e., authentication failure).

If the values match at step 572, the primary token exchange request may be accepted (i.e., authentication success) at step 578. However, in some embodiments, additional authentication steps may be performed after matching the hash values. For example, at step 574, the TES system 305 may compare the timestamp in the request header to a current time tracked by the TES system 305. If the values match within a predetermined amount of time (e.g., values different by no more than x seconds), the primary token exchange request may be accepted at step 578. In some embodiments, yet another authentication step may be performed. For example, if the primary token exchange request passes the timestamp check at step 574, the TES system 305 may validate the nonce value against a usage table at step 576, to insure the nonce value has not been seen within a configured time skew window. If the nonce value is validated, the primary token exchange request may be accepted at step 578.

If any of the authentication steps performed as discussed above results in an error condition, the TES system 305 may return an authentication failure message to the merchant system 110, the authentication failure message containing one or more of the following authentication error messages:

| Code | Message |
|---|---|
| 401.101 | "Invalid apiMerchantIdentfier" |
| 401.102 | "Timestamp outside window" |
| 401.103 | "Duplicate Nonce" |
| 401.104 | "Signature Failed" |
| 401.105 | "Ingredient missing" (log missing fieldname) |

It should be noted that, the authentication method illustrated in FIGS. 5A-5B is merely exemplary, and other types of authentication may be used. In other words, any authentication method that is now-known or later-developed (e.g., user name and password, certificate-based, Web Services Security (WSS)-based, etc.) may be used to authenticate a primary token exchange request.

With renewed reference to FIG. 3, once the primary token exchange request has been authenticated, the request may be further processed by the tokenization orchestration logic 310. The tokenization orchestration logic 310 may generate a globally unique identifier (GUID) for each received request. The GUID may be written with any log entries associated with transaction(s) resulting from the request. The GUID and the log entries associated with the GUID may facilitate transaction tracking for troubleshooting purposes. The same GUID may be returned in the primary token exchange response that corresponds to the request, and may be used/submitted by the client (e.g., a merchant) via the merchant portal 330, in order to investigate the associated transaction(s) using the log entries. For example, the merchant portal 330 may provide a date-filtered reporting view of token exchange transaction counts for each token service provider, the token exchange transaction counts being grouped by total requests, successful requests, failed requests, etc.

As transaction(s) resulting from a request flow through the TES system 305, each milestone or transaction event may be logged. For example, the logged transaction events may include making a call to a token vault, completing a database call, mapping transaction data, request and response data themselves, etc. The log entries may be saved in the TES database 315, and may be used as reporting data for the client (e.g., a merchant). Sensitive data may be masked when saved in log entries. The sensitive data to be masked may include payment card industry (PCI) data elements (e.g., card number, card security code, etc.), personally identifiable information (PII) (e.g., name, address, social security number, date of birth, account number, etc.), and passwords and keys.

FIGS. 6A-6B illustrate exemplary request bodies of primary token exchange requests, according to one aspect of the present disclosure. Particularly, FIG. 6A illustrates an exemplary request body of a primary token exchange request associated with a credit/debit card, and FIG. 6B illustrates an exemplary request body of a primary token exchange request associated with an electronic check. In FIG. 6A, the request body includes details of the input token ("token"), such as a token service provider configuration identifier ("profileId"), a token value ("value"), and payment vehicle type ("payloadType"). The request body further includes supplemental information ("cardDetails" and "addressDetails"), including an expiration date ("expirationDate"), a security code ("cvv2"), a name ("name"), and an address ("address1"). The request body also specifies one or more output token service provider configurations ("outputTokenProvider ProfileIds") by their respective identifiers ("xidDPS1," "omni-ecomm," "wpg-ecomm," etc.). The request body in FIG. 6B contains data similar to those illustrated in FIG. 6A, but the data may pertain to an electronic check rather than a credit/debit card.

Referring back to FIG. 3, based on the request body of the primary token exchange request, the tokenization orchestration logic 310 may send instructions to individual TSP adapters 350A-350E via token vault interface 325, the instructions causing the TSP adapters 350A-350E to construct and send ancillary requests to token vaults 355A-355E. In other words, the primary token exchange request may be parsed and/or read by the tokenization orchestration logic 310, and instructions may be sent to appropriate TSP adapters by the tokenization orchestration logic 310 in order to satisfy the conditions specified in the primary token exchange request. The resultant requests generated by the TSP adapters may be referred to as ancillary requests. For example, a primary token exchange request may cause appropriate TSP adapters to generate i) an ancillary detokenization request for detokenizing the input token contained in the primary token exchange request (thus retrieving sensitive data from the token), and ii) one or more additional ancillary tokenization requests for tokenizing the retrieved sensitive data into output tokens.

The ancillary requests may be generated by the appropriate TSP adapters based on the configuration data pertaining to the recipient token service provider(s) specified in the primary token exchange request. The configuration data may be retrieved from the TES database 315 using the token service provider configuration identifier(s) included in the primary token exchange request.

The tokenization orchestration logic 310 may also receive, from the token vaults 355A-355E via the corresponding TSP adapters 350A-350E, responses to the previously-submitted ancillary requests, and generate a primary token exchange response based on the received responses. A response received by the tokenization orchestration logic 310 from a token vault may be called an ancillary response throughout the present disclosure. Depending on whether tokenization or detokenization has been requested, the ancillary response may be called an ancillary tokenization response or an ancillary detokenization response.

Based on the received ancillary responses, the tokenization orchestration logic 310 may generate a primary token exchange response. FIG. 7 illustrates an exemplary response body of a primary token exchange response, according to one aspect of the present disclosure. In general, the response body may include the GUID that was created when the primary token exchange request was initially received, and details of the one or more output tokens ("tokens") returned by the corresponding output token vaults. For each output token, such details may include an output token service provider identifier ("tokenProvider"), an output token service provider configuration identifier ("profileId"), a token value ("value"), etc. For certain output tokens, details may include additional information such as output token service provider reference identifier ("tokenProviderRefId"), and indication of whether the token is newly created ("newlyCreatedToken"). Further, if there was any error during processing of the token exchange request, details may include an error code ("errorCode") as well as a message describing the error ("message"). The tokenization orchestration logic 310 may transmit the primary token exchange response containing the output tokens to the merchant system 110. The merchant system 110 may then store (e.g., cache) the output tokens in a local storage. The merchant system 110 may use the output tokens to utilize transaction processors configured for the output tokens. For example, the merchant system 110 may transmit transaction data including an output token to a transaction processor that is configured to process that output token.

During processing of a primary token exchange request and resultant ancillary requests/responses, various components of the TES system 305 may encounter error conditions. These error conditions may be reported to the tokenization orchestration logic 310, which may subsequently log the error conditions in the TES database 315. Further, the tokenization orchestration logic 310 may send one or more responses to the merchant system 110, each response including one or more status codes and corresponding message(s) explaining the error(s). The following are examples of the status codes and messages that may be included in the error-reporting responses:

| HTTP Status Codes - used to report failures to process as request | | |
|---|---|---|
| Code | Category | Message |
| 200 - OK | Success | Successful request |
| 400 - Bad Request | | Unable to parse the request message |
| 401 - Unauthorized | | Failed to authenticate the request |
| 404 - Not Found | notFound | The requested resource '{resource}' could not be found. |
| 405 - Not allowed | notAllowed | Action '{method}' not allowed against resource '{relative uri}'. |
| 500 - Internal Server Error | systemError | Unexpected exception occurred during processing |

| API Error Codes - used to report errors by the main API service | | | |
|---|---|---|---|
| StatusCode | Applicable Source(s) | Description | Message |
| 0 | api, provider | Request received | "Request received" |
| 100 | api, provider | Success | "Success" |
| 200 | api, provider | Unexpected error | "Unexpected error occurred" Note: catch all for all internal errors that should not be revealed to the merchant |

| API Error Codes - used to report errors by the main API service | | | |
|---|---|---|---|
| StatusCode | Applicable Source(s) | Description | Message |
| 201 | api | Authentication failed | "Authentication failed" |
| 202 | api | Missing or malformed request body | "Missing or malformed JSON object" |
| 203 | api | Unknown Token service provider Profile | "ProfileId '{X}' does not exist" |
| 204 | api | Unauthorized action | "The merchant account does not have the requested permission '{tokenize\|detokenize}'" |
| 205 | api | Action not supported by provider | "Token service provider '{X}' does not support '{tokenize\|detokenize}' action" |
| 206 | api, provider | Missing required field | "Required field '{X}' was not supplied" |
| 207 | api, provider | Invalid field format | "Field '{X}' value '{Y}' is in the wrong format. Expected format is '{Z}'" |
| 208 | api, provider | Invalid field value | "Field '{X}' value '{Y}' is invalid" |
| 209 | api, provider | Invalid field length | "Field '{X}' value '{Y}' cannot be greater than '{Z}'" |
| 210 | provider | Missing required configuration | "Profile configuration item '{X}' is missing" |
| 211 | provider | Invalid configuration value | "Profile configuration item '{X}' is invalid" |
| 300 | processor | Connection failed | "Could not connect to token service provider '{X}'" |
| 301 | processor | Provider failure | "Provider '{X}' could not process the request" |

With continuing reference to FIG. 3, token vault interface 325 may be situated between the tokenization orchestration logic 310 and the TSP adapters 350A-350E, and may be available to both the tokenization orchestration logic 310 and the TSP adapters 350A-350E. Token vault interface 325 may enable TSP adapters 350A-350E to interface with the tokenization orchestration logic 310 and vice versa. In one embodiment, token vault interface 325 may comprise an API contract that the TSP adapters 350A-350E may implement.

TSP adapters 350A-350E may receive instructions to generate ancillary requests from the tokenization orchestration logic 310 via the token vault interface 325. Each TSP adapter may contain a logic specific to its corresponding token service provider. Therefore, the TSP adapters may generate ancillary requests that conform to the message formats followed by the corresponding token service providers (i.e., corresponding token vaults). Each TSP adapter may receive an ancillary response from the corresponding token vault (i.e., corresponding one of token vaults 355A-355E), and may return the ancillary response or the results derived from the ancillary response (e.g., sensitive data, token, error condition, etc.) to the token orchestration logic 310 via the token vault interface 325.

As alluded to above, TES system 305 may support multiple token service providers. The services provided by the token service providers may be accessible by the TES system 305 by way of the TSP adapters 350A-350E. TSP adapters enabling access to new token service providers may be added to the TES system 305 without the need for a new code or code changes to the core service of the TES system 305. In some embodiments, a new TSP adapter may be added to the TES system 305 via database seeding and deployment of new adapter library.

Token vaults 355A-355E may be a data repository/server that stores token-to-sensitive data mapping information for encrypting (e.g., tokenizing) and decrypting (e.g., detokenizing) sensitive data involved in tokenization. In some embodiments, token vaults 335A-355E may actually be token service providers comprising data repositories/servers that store token-to-sensitive data mapping information. Therefore, token vaults 355A-355E may also be referred to as token service providers 355A-355E in the present disclosure. The terms "token service provider" and "token vault" may thus be used interchangeably throughout the present disclosure. Token vaults 355A-355E may comply with payment card industry (PCI) specifications. As alluded to above, a TSP adapter may generate and transmit an ancillary request to a corresponding token vault, and receive an ancillary response from the token vault. The ancillary response may contain a token, sensitive data, and/or error conditions. The ancillary response or results derived from the ancillary response may then be transmitted to the tokenization orchestration logic 310 for further processing.

It should be noted that, although the API endpoint 320, tokenization orchestration logic 310, token vault interface 325, and/or TSP adapters 350A-350E are shown as separate components (e.g., application logics) within the TES system 305 in FIG. 3, these components may actually be a single component (e.g., an application logic) performing all of the functions described with respect to the API endpoint 320, tokenization orchestration logic 310, token vault interface 325, and/or TSP adapters 350A-350E. Such a single component may collectively be referred to as the TES orchestration logic 310. However, the API endpoint 320, tokenization orchestration logic 310, token vault interface 325, and/or TSP adapters 350A-350E may indeed be separate components within the TES system 305. In other words, it should be appreciated that the configurations specifically discussed herein regarding the arrangement and/or the division of the components depicted in FIG. 3 are merely exemplary, and different combinations of components may be implemented on a single device or multiple computing devices to perform the steps described in the present disclosure.

The TES system 305 may act as a secure intermediary for acquiring 1-to-N tokens from an originating token, across disparate token platforms, without exposing sensitive data elements to parties that are unauthorized or at risk (e.g., a merchant system). The TES system 305 may thus provide a secure form of interoperability between services that do not natively support each other's tokens. The TES system 305 may be called within the context of an e-commerce checkout process, where a client-side (e.g., user browser 115) call to the TES system 305 may be invoked. The TES system 305 may comprise multiple application servers, each application server configured to perform all or a portion of the functions of the TES system 305 contemplated in the present disclosure. Multiple application servers may be implemented to ensure redundancy, e.g., to maintain at least two active servers during patching activities. The multiple application servers may be fronted by a load balancer, to ensure each application server has an appropriate amount of workload.

Figure 8:
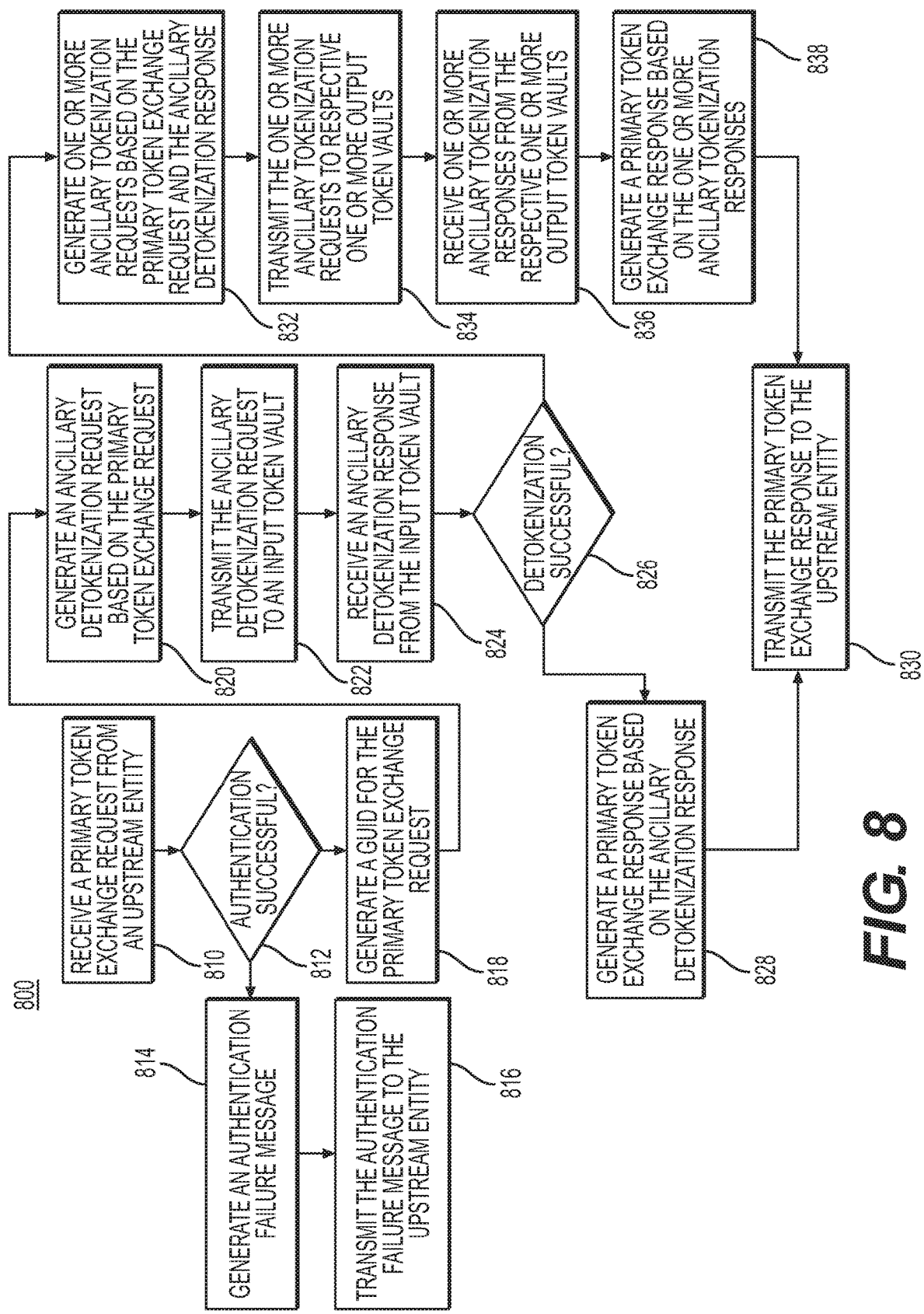
FIG. 8 is a flowchart of an exemplary method of performing a token exchange, according to one aspect of the present disclosure.

FIG. 8 shows a flowchart illustrating an exemplary method of performing a token exchange, according to one aspect of the present disclosure. Notably, the method 800 may be performed by the TES system 305. At step 810, the TES system 305 may receive a primary token exchange request from an upstream entity (e.g., merchant system 110). As alluded to above, the primary token exchange request may contain an input token (e.g., input token value). At step 812, the TES system 305 may authenticate the primary token exchange request. If the authentication is unsuccessful, the method 800 may proceed to step 814, where the TES system 305 may generate an authentication failure message. At step 816, the TES system 305 may transmit the authentication failure message to the upstream entity.

If the authentication is successful however, the method 800 may proceed to step 818, where the TES system 305 may generate a GUID for the primary token exchange request. The GUID may be stored in the TES database 315. At step 820, the TES system 305 may generate an ancillary detokenization request based on the primary token exchange request. The ancillary detokenization request may contain the input token and may be routed to an input token vault. The input token vault may be identified by the input token service provider configuration identifier included in the primary token exchange request. At step 822, the TES system 305 may transmit the ancillary detokenization request to the input token vault, which contains token-to-sensitive data mapping. The input token vault may determine the sensitive data that correspond to the input token, and return an ancillary detokenization response containing the sensitive data or an error message to the TES system 305.

At step 824, the TES system 305 may receive the ancillary detokenization response from the input token vault. At step 826, the TES system 305 may determine whether the detokenization was successful. For example, the TES system 305 may determine that the detokenization was unsuccessful if the ancillary detokenization response does not contain the sensitive data, or if the ancillary detokenization response contains an error message indicating detokenization failure. The TES system 305 may determine that the detokenization was successful if the ancillary detokenization response contains the sensitive data and no error message indicating detokenization failure. If the TES system 305 determines that detokenization was unsuccessful, the method 800 may proceed to step 828, where the TES system 305 may generate a primary token exchange response based on the ancillary detokenization response indicating the detokenization failure. Therefore, the primary token exchange response may also indicate the detokenization failure in the response body. At step 830, the TES system 305 may transmit the primary token exchange response to the upstream entity.

If the TES system 305 determines that detokenization was successful, the method 800 may proceed to step 832 instead. At step 832, the TES system 305 may generate one or more ancillary tokenization requests based on the ancillary detokenization response comprising the sensitive data. Further, the ancillary tokenization requests may be generated based on the primary token exchange request, as the primary token exchange request includes output token service provider configuration identifiers and supplemental information. Based on the output token service provider configuration identifiers, the TES system 305 may determine the output token vaults to which the ancillary tokenization requests may be transmitted. The sensitive data received from the input token vault may be included in the ancillary tokenization request. Further, all or a portion of the supplemental information may also be included in the ancillary tokenization request, if any output token vault may require such supplemental information to generate/retrieve an output token. For instance, when there is no complete parity between the source and destination data elements (e.g., when an output token vault may require supplemental information, in addition to the sensitive data retrieved based on the input token, to generate or retrieve a corresponding output token), supplemental information may be submitted along with the sensitive data (e.g., addition of an expiration date data to a primary account number).

At step 834, the TES system 305 may transmit the one or more ancillary tokenization requests to the respective one or more output token vaults 355A-355E. Each ancillary tokenization request may contain the sensitive data received from the input token vault. Each of the one or more output token vaults 355A-355E may generate or retrieve an output token based on the ancillary tokenization request, generate an ancillary tokenization response including the output token, and transmit the ancillary tokenization response to the TES system 305. If an output token vault is unable to generate or retrieve an output token, the ancillary tokenization response may include a message indicating the tokenization failure.

At step 836, the TES system 305 may receive the one or more ancillary tokenization responses from the respective one or more output token vaults 355A-355E. At step 838, the TES system 305 may generate a primary token exchange response based on the one or more ancillary tokenization responses. An exemplary primary token exchange response (e.g., response body) was discussed above in reference to FIG. 7. In general, the primary token exchange response may include output tokens received from the corresponding output token vaults and any error messages indicating tokenization failures or other errors. At step 830, the TES system 305 may transmit the primary token exchange response to the upstream entity.

Figure 9A:
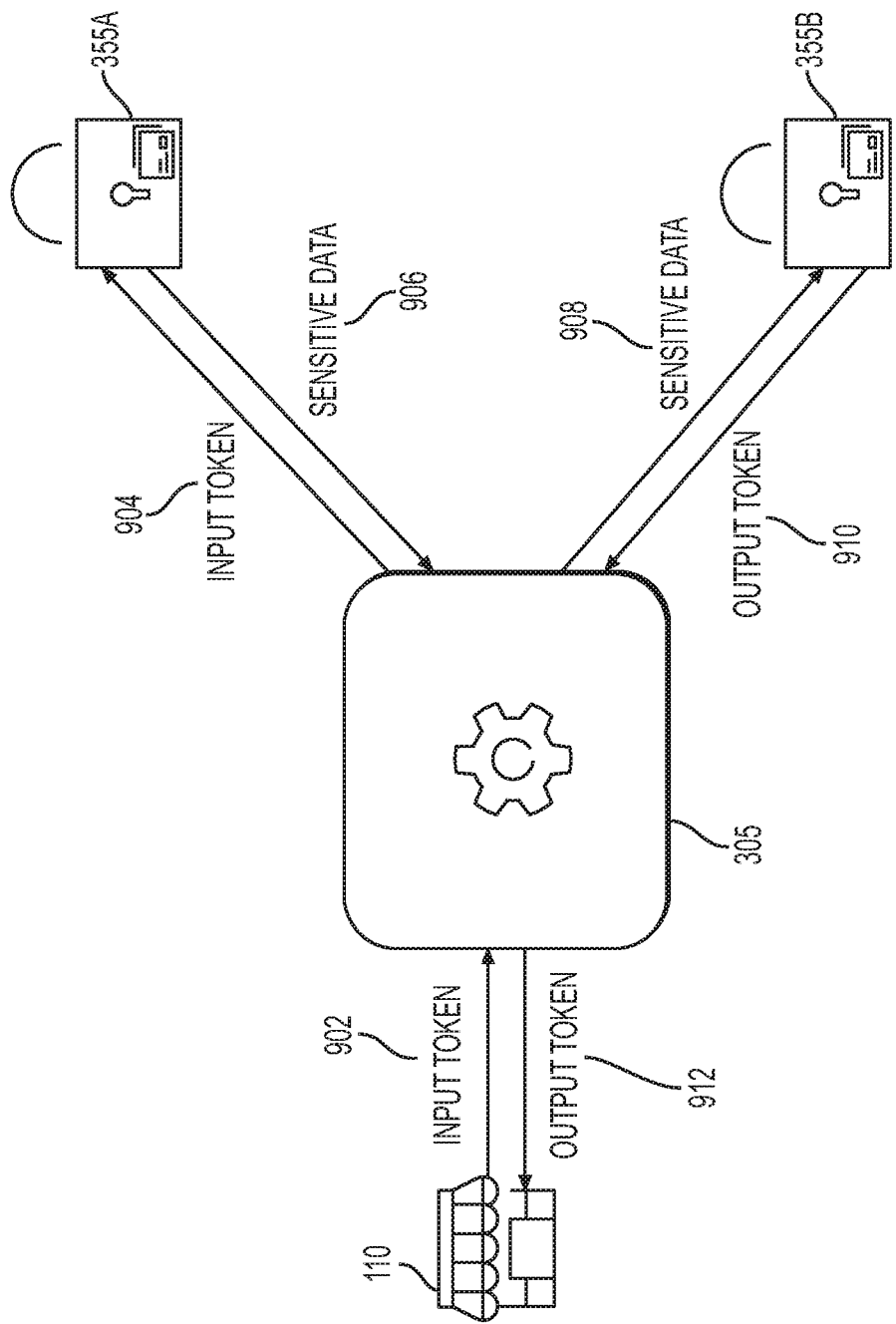
FIGS. 9A-9C illustrate exemplary scenarios in which a merchant system integrates with a TES system to perform a token exchange.
Figure 9B:
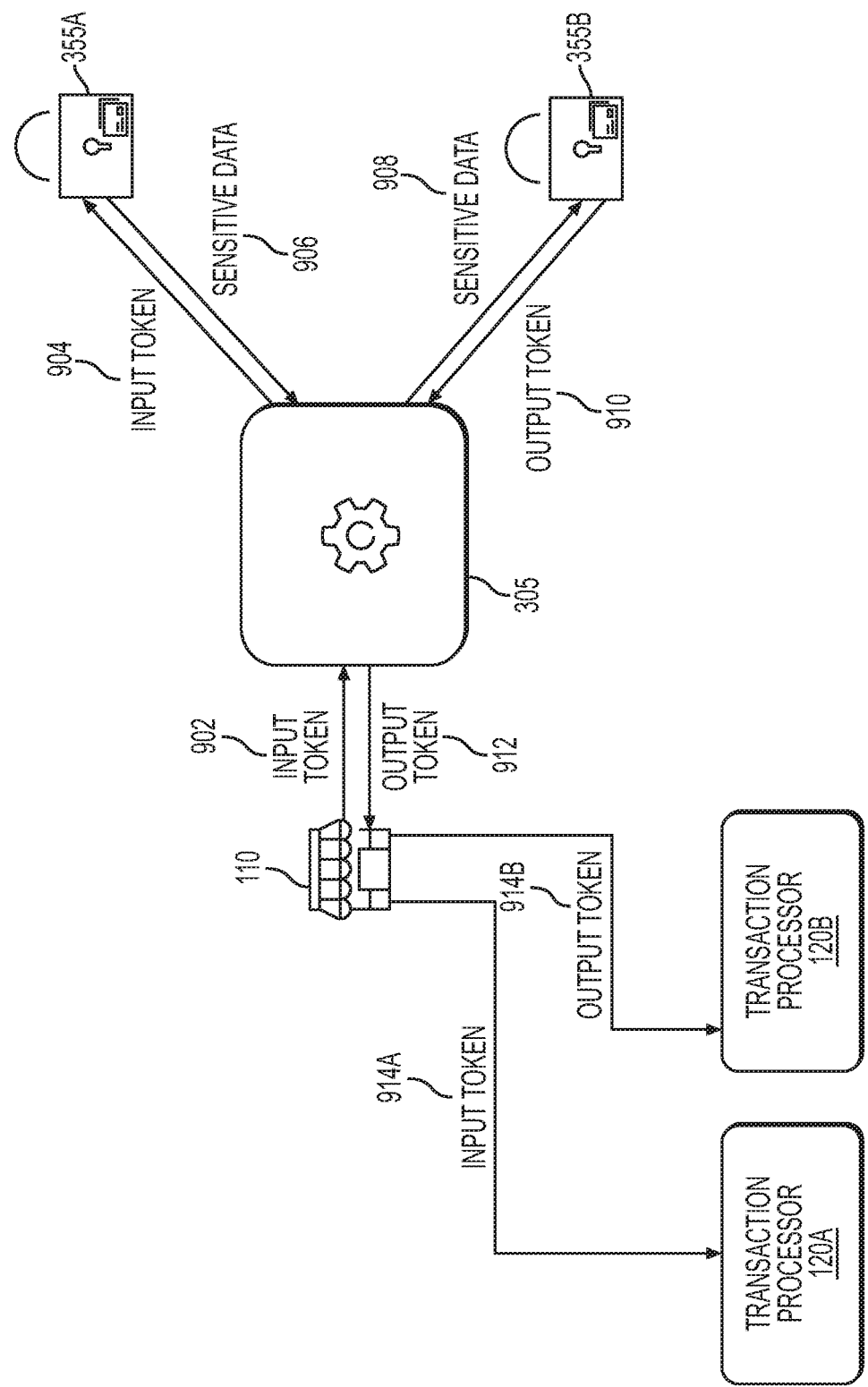
Figure 9C:
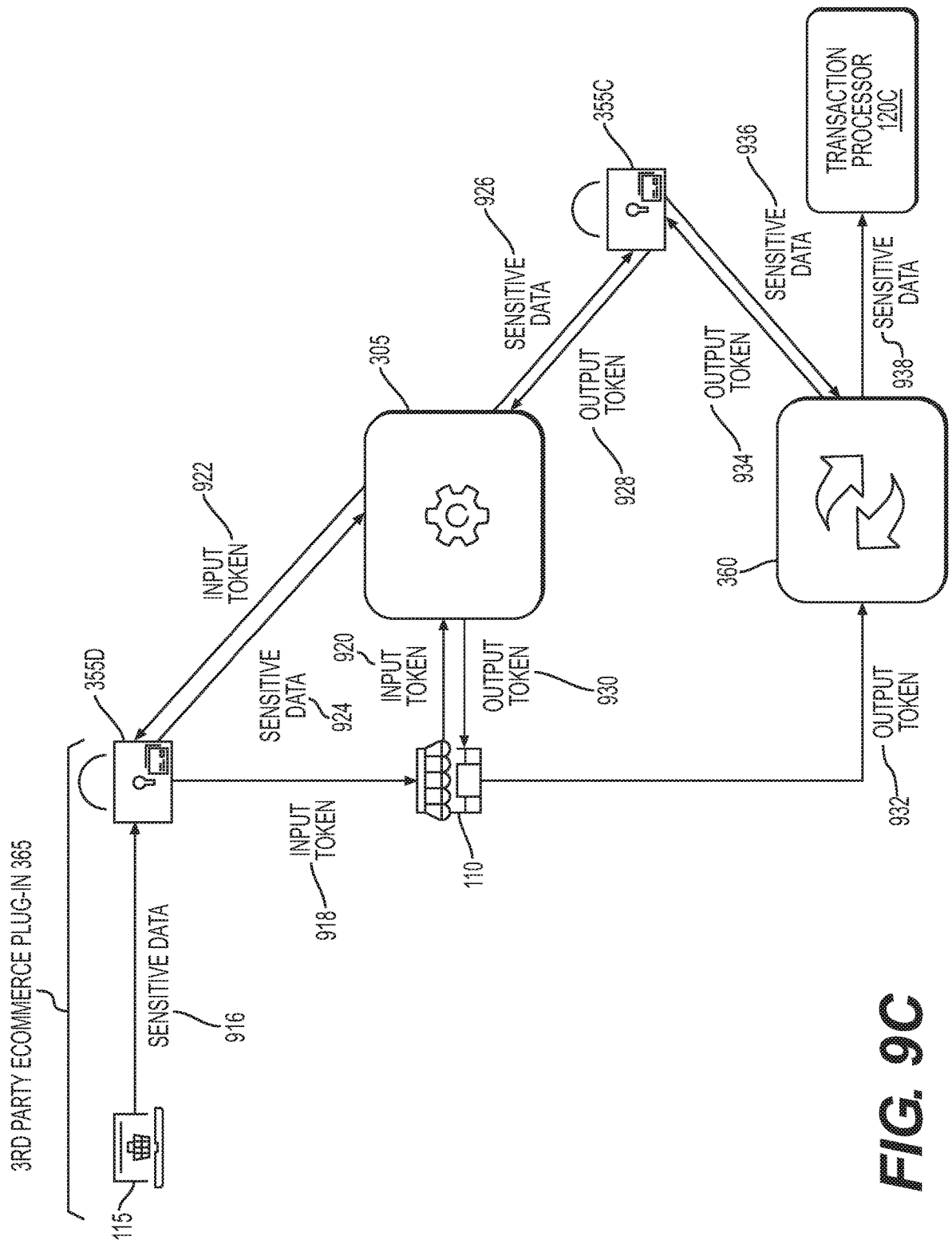

FIGS. 9A-9C illustrate exemplary scenarios in which a merchant system 110 integrates with the TES system 305 to perform a token exchange. Each of FIGS. 9A-9C will be explained in greater detail in the following sections.

FIG. 9A shows a schematic block diagram illustrating an exemplary token exchange scenario via direct TES integration (e.g., merchant system 110 directly coupled to TES system 305). In FIG. 9A, at step 902, the merchant system 110 may send a primary token exchange request to the TES system 305, the primary token exchange request comprising an input token. As alluded to above, the primary token exchange request may also specify the input token service provider via input token service provider configuration identifier (e.g., "profileId") and output token service providers via output token service provider configuration identifiers (e.g., "outputTokenProvider ProfileIds"). Upon receiving and authenticating the primary token exchange request, the TES system 305 may parse the token exchange request and generate an ancillary detokenization request. At step 904, the TES system 305 may send the ancillary detokenization request to the input token service provider, e.g., the input token vault 355A. As alluded to above, the ancillary detokenization request may comprise the input token. The input token vault 355A may determine sensitive data that corresponds to the input token, based on the token-to-sensitive data mapping. The input token vault 355A may then generate an ancillary detokenization response comprising the sensitive data. At step 906, the input token vault 355A may transmit the ancillary detokenization response to the TES system 305.

The TES system 305 may then generate an ancillary tokenization request based on the ancillary detokenization response and primary token exchange request. At step 908, the TES system 305 may send the ancillary tokenization request to one or more output token service providers, e.g., the output token vault 355B. For ease of illustration, FIG. 9A only shows one output token vault 355B, but it should be appreciated that ancillary tokenization requests may be sent to more than one output token vault, either synchronously or asynchronously. In some embodiments, parallel transmission of the ancillary tokenization requests to multiple output token vaults may be preferred, in order to reduce the overall response time. However, the ancillary tokenization requests may also be transmitted serially.

The output token vault 355B may generate or retrieve an output token based on i) the sensitive data contained in the ancillary tokenization request and/or ii) the token-to-sensitive data mapping. The output token vault 355B may generate an ancillary tokenization response comprising the output token. At step 910, the output token vault 355B may transmit the ancillary tokenization response to the TES system 305. The TES system 305 may generate a primary token exchange response based on the ancillary tokenization response. As alluded to above, the primary token exchange response may comprise the output token. At step 912, the TES system 305 may transmit the primary token exchange response to the merchant system 110. The merchant system 110 may retrieve the output token from the primary token exchange response and store the output token in a local or remote storage for future use.

FIG. 9B shows a schematic block diagram that has been expanded from that of FIG. 9A, to illustrate the usage of input and output tokens. As explained above in reference to FIG. 9A, the merchant system 110 may exchange an input token for an output token, and may store both the input and output tokens in a local storage, or a remote storage. At step 914A, the merchant system 110 may transmit transaction data including the input token to transaction processor 120A for further transaction processing discussed above in reference to FIGS. 1-2. The transaction processor 120A may comprise a token service, or may be in communication with a remotely-located token service provider, either of which may be configured to generate the input token and retain token-to-sensitive data mapping information pertaining to the input token. Therefore, the transaction processor 120A may be configured to process the input token.

Prior to the token exchange, the merchant system 110 may only be able to utilize the services of the transaction processor 120A, since the merchant system 110 only has the input token. However, due to the implementation of the TES system 305, the merchant system 110 may be able to use the services provided by other transaction processors, such as, e.g., transaction processor 120B. The transaction processor 120B may also comprise a token service or may be in communication with a remotely-located token service provider. The token service or token service provider of the transaction processor 120B may be configured to generate the output token and retain token-to-sensitive data mapping information pertaining to the output token. In other words, the transaction processor 120B may be configured to process the output token, rather than the input token. Via the token exchange service provided by the TES system 305, the merchant system 110, which previously retained only the input token, may now use the services of the transaction processor 1206 using the output token returned from the TES system 305. For example, at step 914B, the merchant system 110 may transmit transaction data including the output token to the transaction processor 1206 for further transaction processing discussed above in reference to FIGS. 1-2.

FIG. 9C shows a schematic block diagram illustrating another exemplary token exchange scenario via direct TES integration. Notably, the merchant system 110 may initially receive an input token from a third-party token service provider, i.e., a third-party token vault 355D. A third-party token service provider may provide a tokenization plug-in service for the merchant system 110. For instance, a third-party tokenization plug-in 365 may be implemented at an e-commerce site of the merchant. As shown at step 916, the third-party tokenization plug-in 365 may route a consumer's sensitive data entered via the user browser 115 to the third-party token vault 355D. The third-party token vault 355D may generate an input token based on the sensitive data, or retrieve the input token based on token-to-sensitive data mapping stored therein. At step 918, the third-party token vault 355D may transmit the input token to the merchant system 110. The merchant system 110 may then generate a primary token exchange request comprising the input token. The primary token exchange may also specify the third-party token service provider that is configured to process the input token. At step 920, the merchant system 110 may transmit the primary token exchange request to the TES system 305. Upon receiving and authenticating the primary token exchange request, the TES system 305 may parse the primary token exchange request and generate an ancillary detokenization request. At step 922, the TES system 305 may send the ancillary detokenization request to the third-party token vault 355D. As alluded to above, the ancillary detokenization request may comprise the input token. The third-party token vault 355D may determine sensitive data that corresponds to the input token, based on the token-to-sensitive data mapping. The third-party token vault 355D may then generate an ancillary detokenization response comprising the sensitive data. At step 924, the third-party token vault 355D may transmit the ancillary detokenization response to the TES system 305.

The TES system 305 may then generate an ancillary tokenization request based on the ancillary detokenization response and primary token exchange request. As alluded to above, the ancillary tokenization request may comprise the sensitive data. At step 926, the TES system 305 may send the ancillary tokenization request to one or more output token service providers, e.g., the output token vault 355C. Again, for ease of illustration, FIG. 9C only shows one output token vault 355C, but it should be appreciated that ancillary tokenization requests may be sent to more than one output token vault, either synchronously or asynchronously.

The output token vault 355C may generate an output token based on the sensitive data contained in the ancillary tokenization request, or retrieve an output token based on the token-to-sensitive data mapping. The output token vault 355C may generate an ancillary tokenization response comprising the output token. At step 928, the output token vault 355C may transmit the ancillary tokenization response to the TES system 305. The TES system 305 may generate a primary token exchange response based on the ancillary tokenization response. As alluded to above, the primary token exchange response may comprise the output token. At step 930, the TES system 305 may transmit the primary token exchange response to the merchant system 110. The merchant system 110 may retrieve the output token from the primary token exchange response and store the output token in a local or remote storage for future use.

Prior to the token exchange, the merchant system 110 only had an input token provided by a third-party token service provider (i.e., third-party token vault 355D), which may not be compatible with the transaction processor 120C. However, by utilizing the token exchange service of the TES system 305, the merchant system 110 may obtain an output token that may be compatible with the transaction processor 120C. At step 932, the merchant system 110 may transmit transaction data including the output token to auxiliary service system 360. An auxiliary service system may be a system that provides a service for or a service associated with a transaction processor, or that enhances or aids the functionalities of a transaction processor. For example, auxiliary service system 360 may include i) a mechanism that receives tokens from a merchant system on behalf of transaction processor 120C, detokenizes the tokens into sensitive data, and submits the sensitive data to the transaction processor 120C for faster and more efficient processing (e.g., transaction processor 120C offloads decryption/detokenization to the auxiliary service system 360), or ii) any other mechanism that may enhance transaction security, transaction workflow, interoperability across transaction platforms, customer experience, etc.

At step 934, the auxiliary service system 360 may transmit the output token to the output token vault 355C. The output token vault 355C may retrieve sensitive data based on the output token and the token-to-sensitive data mapping information pertaining to the output token. At step 936, the output token vault 355C may transmit the sensitive data to the auxiliary service system 360. At step 938, the auxiliary service system 360 may transmit the retrieved sensitive data, along with any other transaction data, to the transaction processor 120C for further transaction processing discussed above in reference to FIGS. 1-2.

It should be noted that, in FIG. 9B, in lieu of transmitting the tokens directly to the respective transaction processors 120A-120B, the merchant system 110 may first submit each token to an auxiliary service system that is configured to detokenize the token into sensitive data on behalf of the corresponding transaction processor. The auxiliary service systems may then transmit the sensitive data to the respective transaction processors. As alluded to above, this will enable the transaction processors to offload decryption (i.e., detokenization) to the auxiliary service systems in advance.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

In addition, embodiments of the present disclosure further relate to computer storage products with a computer-readable medium that have computer code thereon for performing various computer-implemented operations. The media and computer code may be those specially designed and constructed for the purposes of the present disclosure, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

While the present disclosure has been described in terms of several embodiments, there are alterations, modifications, permutations, and substitute equivalents, that fall within the scope of this disclosure.

It should also be noted that there are many alternative ways of implementing the methods and systems of the present disclosure. It is therefore intended that the following appended claims be interpreted as including all such alterations, modifications, permutations, and substitute equivalents as fall within the true spirit and scope of the present disclosure.

What is claimed is:

1. A method for cross-platform token exchange, comprising:
   receiving, by a token exchange service system, a primary token exchange request from an upstream entity;
   generating, by the token exchange service system, an ancillary detokenization request based on the primary token exchange request;
   transmitting, by the token exchange service system, the ancillary detokenization request to an input token vault;
   receiving, by the token exchange service system, an ancillary detokenization response from the input token vault;
   generating, by the token exchange service system, one or more ancillary tokenization requests based on the primary token exchange request and the ancillary detokenization response;
   transmitting, by the token exchange service system, the one or more ancillary tokenization requests to respective one or more output token vaults;
   receiving, by the token exchange service system, one or more ancillary tokenization responses from the respective one or more output token vaults;
   generating, by the token exchange service system, a primary token exchange response based on the one or more ancillary tokenization responses; and
   transmitting, by the token exchange service system, the primary token exchange response to the upstream entity.

2. The method of claim 1, wherein the primary token exchange request is an application programming interface (API) request.

3. The method of claim 1, wherein the primary token exchange request comprises:
an input token value.

4. The method of claim 3, wherein the ancillary detokenization request is transmitted to the first token vault using an input token service provider configuration identifier and comprises the input token value.

5. The method of claim 3, wherein the ancillary detokenization response comprises payment vehicle information, the payment vehicle information comprising a primary account number and supplemental information.

6. The method of claim 5, wherein
the one or more ancillary tokenization requests are transmitted to the one or more output token vaults using one or more output token service provider configuration identifiers, and
each of the one or more ancillary tokenization requests comprises at least one of the primary account number and supplemental information.

7. The method of claim 6, wherein the supplemental information comprises one or more of: a payment vehicle expiration date, an address, and a card security code.

8. The method of claim 1, wherein each of the one or more ancillary tokenization responses comprises an output token value.

9. The method of claim 8, wherein the primary token exchange response comprises the output token values and corresponding output token service provider configuration identifiers.

10. The method of claim 9, wherein the output token values and the corresponding output token service provider configuration identifiers are stored in a database of the upstream entity.

11. A system for cross-platform token exchange, the system comprising:
one or more processors; and
at least one data storage storing instructions which, when executed by the one or more processors, cause the one or more processors to perform a method comprising:
receiving, by a token exchange service system, a primary token exchange request from an upstream entity;
generating, by the token exchange service system, an ancillary detokenization request based on the primary token exchange request;
transmitting, by the token exchange service system, the ancillary detokenization request to an input token vault;
receiving, by the token exchange service system, an ancillary detokenization response from the input token vault;
generating, by the token exchange service system, one or more ancillary tokenization requests based on the primary token exchange request and the ancillary detokenization response;
transmitting, by the token exchange service system, the one or more ancillary tokenization requests to respective one or more output token vaults;
receiving, by the token exchange service system, one or more ancillary tokenization responses from the respective one or more output token vaults;
generating, by the token exchange service system, a primary token exchange response based on the one or more ancillary tokenization responses; and
transmitting, by the token exchange service system, the primary token exchange response to the upstream entity.

12. The system of claim 11, wherein the primary token exchange request comprises:
an input token value.

13. The system of claim 12, wherein the ancillary detokenization request is transmitted to the first token vault using an input token service provider configuration identifier and comprises the input token value.

14. The system of claim 12, wherein the ancillary detokenization response comprises payment vehicle information, the payment vehicle information comprising a primary account number and supplemental information.

15. The system of claim 14, wherein
the one or more ancillary tokenization requests are transmitted to the one or more output token vaults using one or more output token service provider configuration identifiers, and
each of the one or more ancillary tokenization requests comprises at least one of the primary account number and supplemental information.

16. The system of claim 15, wherein the supplemental information comprises one or more of: a payment vehicle expiration date, an address, and a card security code.

17. The system of claim 11, wherein each of the one or more ancillary tokenization responses comprises an output token value.

18. The system of claim 17, wherein the primary token exchange response comprises the output token values and corresponding output token service provider configuration identifiers.

19. The system of claim 18, wherein the output token values and the corresponding output token service provider configuration identifiers are stored in a database of the upstream entity.

20. A non-transitory computer-readable medium for cross-platform token exchange, the non-transitory computer-readable medium storing instructions that, when executed by one or more processors, cause the one or more processors to perform a method comprising:
receiving, by a token exchange service system, a primary token exchange request from an upstream entity;
generating, by the token exchange service system, an ancillary detokenization request based on the primary token exchange request;
transmitting, by the token exchange service system, the ancillary detokenization request to an input token vault;
receiving, by the token exchange service system, an ancillary detokenization response from the input token vault;
generating, by the token exchange service system, one or more ancillary tokenization requests based on the primary token exchange request and the ancillary detokenization response;
transmitting, by the token exchange service system, the one or more ancillary tokenization requests to respective one or more output token vaults;
receiving, by the token exchange service system, one or more ancillary tokenization responses from the respective one or more output token vaults;
generating, by the token exchange service system, a primary token exchange response based on the one or more ancillary tokenization responses; and
transmitting, by the token exchange service system, the primary token exchange response to the upstream entity.

* * * * *